METHOD OF AND APPARATUS FOR PLYING STRANDS

Original Filed Jan. 26, 1953 3 Sheets-Sheet 1

INVENTOR.
Alfred W. Vibber

METHOD OF AND APPARATUS FOR PLYING STRANDS

Original Filed Jan. 26, 1953 3 Sheets-Sheet 2

INVENTOR.
Alfred W. Vibber

METHOD OF AND APPARATUS FOR PLYING STRANDS

Original Filed Jan. 26, 1953 3 Sheets-Sheet 3

INVENTOR.

Alfred W. Vibber

United States Patent Office

Re. 24,483

Reissued June 10, 1958

24,483

METHOD OF AND APPARATUS FOR PLYING STRANDS

Alfred W. Vibber, Ridgewood, N. J.

Original No. 2,731,785, dated January 24, 1956, Serial No. 333,242, January 26, 1953. Application for reissue November 26, 1957, Serial No. 700,251

24 Claims. (Cl. 57—58.36)

Matter enclosed in heavy brackets [ ] appears in the original patent but forms no part of this reissue specification; matter printed in italics indicates the additions made by reissue.

This invention relates to a method of and an apparatus for plying strands together to form cords. More particularly, the invention relates to the control of the speeds of feeding of the component strands to the point of plying them together, thereby producing a cord having optimum desired characteristics, and to a plying device for carrying out such method which will operate for long periods free from operator attention.

The apparatus of the invention relates to a system such as that shown in patent to Clarkson, No. 2,503,242. In such mechanisms two strands are twisted together so as to form a two-ply strand, a first strand delivered from a first let-off strand package being ballooned about a second let-off strand package from which is fed a second strand. The first strand is withdrawn from the balloon inwardly through the flyer, being plied with the second strand at a zone on the axis of the flyer, the resulting cord or two-ply strand being withdrawn from the point of plying under substantially constant tension. In such systems it has been attempted to feed equal lengths of the two strands to the point of plying by using a first positive feeding means disposed below the first let-off package and a second positive feeding means disposed below the second let-off package, the two feeding means being positively connected together so as to rotate at the same rate. Such feeding means are designed to feed forward equal lengths of the two strands in a given time. Difficulties have been experienced, however, with the control of the balloon in the first strand and, furthermore, the cord produced has had undersirable nonuniformity due to different lengths of the two strands in a given length of cord thus produced.

These difficulties in prior systems arise because of the inherent and inevitable creep between a feeding means and a strand, no matter how positive the feeding of the strand is attempted to be made, over great lengths of the strand. Thus over appreciable intervals of time, during which many thousands of feet of cord are produced, it is impossible with prior systems to maintain synchronized feeding of the two strands by the two feeding means therefor. Such lack of synchronism of feeding of the two strands upsets or undesirably affects the sped of withdrawal of the first strand from the balloon since such speed of withdrawal depends upon (1) the speed of feeding of the second strand from its package and (2) the speed of twisting or plying of the two strands together.

The present application is a continuation-in-part of applications Serial Nos. 238,215, filed July 24, 1951; 274,401, filed March 1, 1952 *now Patent No. 2,729,932 and Patent No. 2,728,185, respectively*; 315,871, filed October 21, 1952; and 317,406, filed October 29, 1952, all bearing the title "Twisting Spindle Balloon Control."

The present invention provides an apparatus and a method of plying two strands together to form a cord in generally the manner of the above Clarkson patent, but positively feeds both strands immediately adjacent the point of their being plied together, whereby the desired lengths of the two strands, usually equal lengths thereof, are supplied at the point of plying. In the first illustrated embodiment the first strand is positively withdrawn at a desired rate from the balloon, the feeding of the strand into the balloon being accomplished in an impositive, "permissive" manner, that is, the first strand is fed into the balloon at a variable rate, such rate being varied so as to maintain the balloon within a predetermined desired range of diameter sizes. In the second illustrated embodiment the first strand is positively fed into the balloon, the feeding means for the strands adjacent the point of plying being connected to be driven at rates synchronized with each other, usually the same speed, but are variable in response to a balloon diameter control, or equivalent control means.

The invention has among its objects the provision of an improved method of and an apparatus for plying together a plurality of strands to form a cord.

The invention has as a further object the provision of a method of and an apparatus for plying together strands wherein the speeds of feeding of the strands immediately adjacent the point of plying are positively synchronized.

Yet another object of the invention resides in the provision, in such system, of positive means for withdrawing the first strand from the balloon and means for correlating the relative speeds of feeding the first strand into and out of the balloon with the balloon diameter, whereby the balloon diameter is controlled automatically.

A further object of the invention resides in the provision of an improved flyer for a spindle for twisting together two strands, in a first illustrated embodiment of the invention the feeding means in such flyer bearing a fixed speed ratio with respect to the speed of rotation of the flyer, and in a second illustrated embodiment the feeding means in the flyer being variable in speed with respect to the speed of rotation of the flyer. In such second illustrated embodiment change of speed of the feeding means in the flyer for the first strand also effects a similar change in the speed of feeding of the second strand from the second let-off package, such two feeding means being synchronized.

The above and further objects of the invention will be more readily apparent upon consideration of the drawings accompanying the specification, in which.

Figure 7:
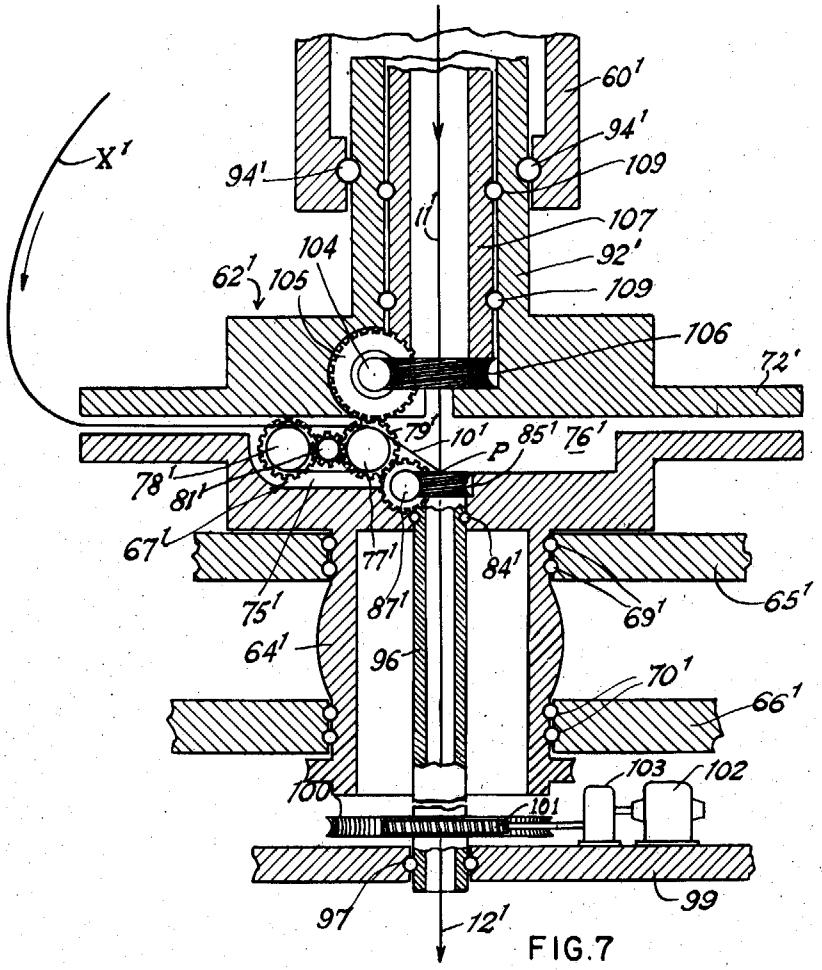
Figure 6:
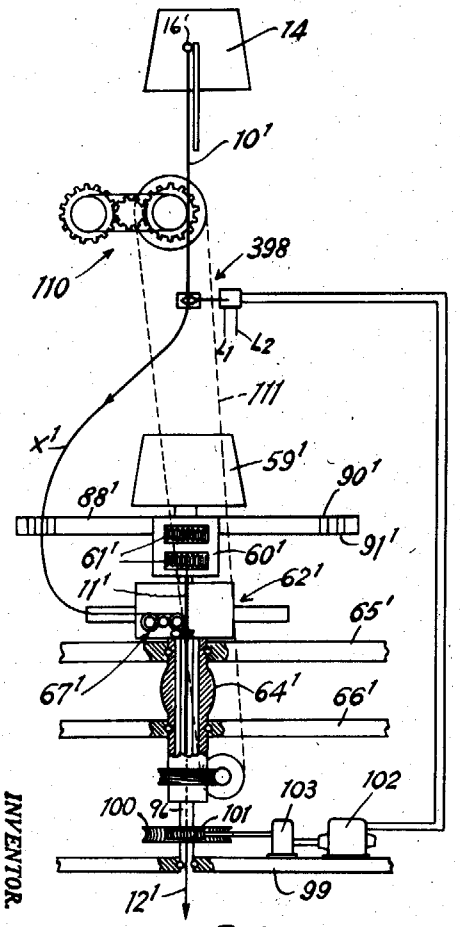

Fig. 6 is a somewhat diagrammatic over-all view in side elevation of the complete system of a second embodiment of the plying system of the invention; and Fig. 7 is a fragmentary view in section of the spindle of the second embodiment of the invention, the section being taken substantially in a vertical axial plane through the flyer. For simplicity of illustration the worm and worm gear for driving strand feeding means 100 have been omitted in Fig. 7.

Figure 1:
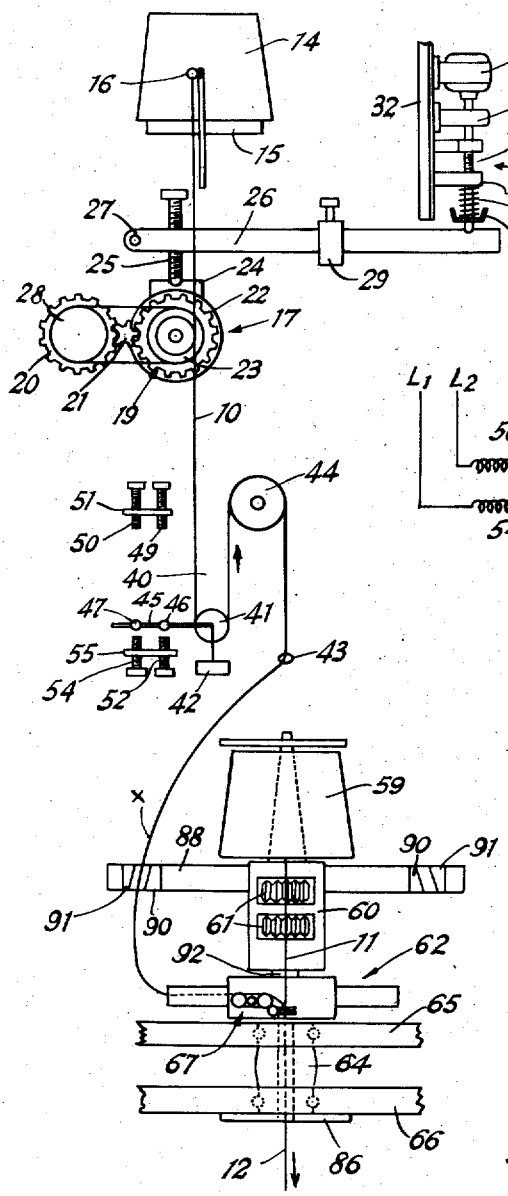
Fig. 1 is a somewhat diagrammatic over-all view in side elevation of the complete system of a first embodiment of the invention.

In the system shown in Fig. 1 the first strand, designated 10, proceeds from the first let-off package 14 downwardly through tension control apparatus, to be described, into the balloon x created by the flyer 62. The strand 10 is drawn in through the flyer by the feeding mechanism 67 therein, to be described, and meets the second strand 11 fed from the second let-off package 59 and positively fed by the feeding means 61 at the point P on the axis of the flyer, the two strands being plied together so as to emerge as the plied strands or cord 12. The cord 12 is taken up by a conventional take-up mechanism. Preferably one such as shown in Clarkson Patent No. 2,503,242, withdrawing the cord under constant tension, is employed.

Taking up now the instrumentalities which operate upon the strand 10 in succession, the first let-off package 14 is preferably rotatably mounted upon the support 15 so as to present the cord opposite the feed-off eye 16. Strand 10 proceeds downwardly from the eye into the strand feeding capstan system generally designated 17. Means 17 is made up of a first multi-grooved capstan 23 and a second multi-grooved capstan 28 spaced therefrom, the two capstans being positively geared together so as to rotate at the same speed and in the same direction by means of the gear 19 on capstan 23, the gear 20 on capstan 28, and the intermediate idle gear 21 meshing with gears 23 and 20, all of such mechanism being carried on fixed framework (not shown). A brake drum 22 is provided on capstan 23 so as variably to retard the two capstans 23 and 28. A brake shoe 24 is thrust against the brake drum 22 by means of the thrust pin 25 mounted on the brake lever 26, such lever being pivotally mounted on a fixed part of the machine (not shown) by the pivot pin 27. The primary braking effort is contributed by the collar shaped weight 29 slidable along lever 26 and positionable thereon by the set screw on top of the weight.

The brake means is variably energized by means of control mechanism, to be described, through the medium of the brake applying device 30. Device 30, mounted upon the frame part 32, includes the small low voltage direct current motor 31 which drives a worm 36 through the speed reducing mechanism 34. Mounted on the worm is the nut 35 which is non-rotatably guided so as to rise and fall as the motor is energized selectively to rotate in reverse directions. A compression spring 37 is disposed about the worm 36 below the nut 35, the lower end of such spring fitting within the spring seat 39 which is supported in a seat on the top of the outer end of the lever 26. The mechanism 30 is more fully described and shown in my application Serial No. 274,401.

In Fig. 1 the balloon x in the strand 10 is under the control of the mechanism which is the subject of the embodiment shown in Figs. 1–4, inclusive, of my application Serial No. 315,871. It is to be understood, however, that the variable speed mechanism for feeding the strand 10 into the balloon x may, if desired, be controlled by other devices for measuring the balloon diameter, the length of material in the balloon, or the tension in the material above the eye of the balloon which are the subjects of my prior pending applications including application Serial No. 238,215.

The mechanism shown forms a loop 40 in the strand 10 immediately below the capstan 23 by means of the freely vertically travelling pulley 41 which is pulled downwardly by the weight 42, such weight being selectively adjustable as by the addition or subtraction of smaller weights thereto or therefrom, respectively. The strand 10 rises from the pulley 41 over the fixed guide pulley 44, from which it travels downwardly through the eye 43 into the balloon x. It will be apparent that the tension to which the material 10 in loop 40 is subjected by the combined weights of the pulley 41 and the weight 42 is transmitted directly to the material in the balloon x. With a proper choice of the value of weight 42 the balloon x will be stable under fixed conditions of flyer speeds, yarn characteristics, etc., since the balloon x, thus subjected to a constant suitable back tension, tends to seek and remain at a given diameter.

Figure 2:
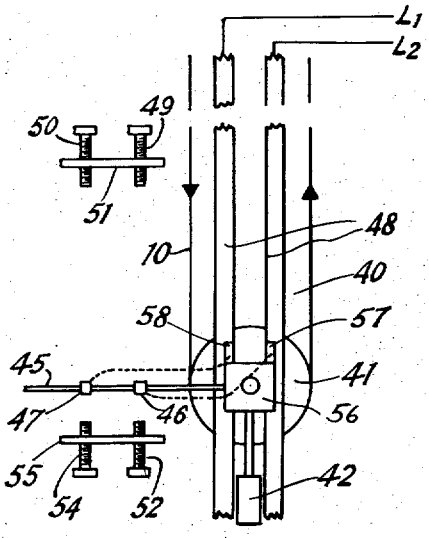
Fig. 2 is a fragmentary view in side elevation of details of the loop forming mechanism forming a part of the means for controlling the rate of feeding of the first strand into the balloon.

Connected to the pulley 41 is the horizontally extending switch arm 45, made of electrically insulating material, which travels therewith between its lower position, in which it engages the bottom contactor 55, to the top position, at which it cooperates with the top contactor 51, both such contactors being mounted on fixed portions of the frame of the machine (not shown). The guide pulley 41 is mounted on opposite ends of its shaft in bearing chocks, of which one is shown at 56 in Fig. 2, such chocks travelling in guide ways provided between two sets of two spaced parallel guide members 48, two of which are shown in Fig. 2. The weight 42 is of such shape as to slide freely in the space provided between such guide members 48. Preferably at least two of the members 48 are insulated from the machine frame and from each other so as to serve as bus bars, one side, $L_1$, of a low tension direct current source being connected to one of such members 48 and the other side, $L_2$, being connected to the other of such members. Connection between the contacts 46 and 47, mounted upon the insulating switch arm 45, is effected through lead wires, shown in dotted lines in Fig. 2, from such contacts to brush members 57 and 58 making connection with their respective members 48.

The contactor 51, which bears separate independently adjustable contacts 49 and 50, insulated from each other, and the contactor 55, which carries similar contacts 52 and 54 together with the switch arm 45 and the contacts 46 and 47, form parts of a reversing and controlling switch for the motor 31 of the brake means 30 above described. The motor 31 is preferably of the type energized by a low potential direct current source, the field 74 being the stator and the rotor 75 being of the fixed high permeability magnet type made, for example, of Alnico. Such motor requires low current feed, thereby minimizing contact difficulties at the reversing switch. Furthermore, because of the permanent magnet rotor, the problem of reversing the motor is a simple one. Because by far the greater part of the necessary retarding torque is contributed by the weight 29, the motor 31 may be of the very small fractional horse power type, and the spring 37 may be comparatively weak.

Figure 3:
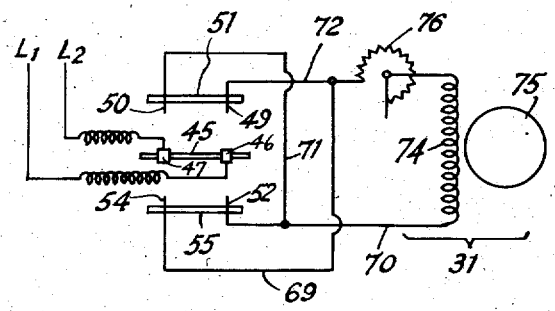
Fig. 3 is a wiring diagram for the motor controlling the speed of feeding of the first strand into the balloon.

The motor 31 is connected to the current source $L_1$, $L_2$ in the manner shown in Fig. 3. The circuit to the motor is such that when the switch arm 45 rises, with the shortening of the loop 40, so that the contacts 46 and 47, respectively, touch contacts 49 and 50, the field 74 of the motor 31 is energized through the thus described contacts and the wires 72 and 71, 70 in such direction as to drive the motor to impel the nut 35 upwardly. The speed at which the motor rotates is adjustable through the manually adjustable rheostat 76 in the motor circuit. The amount of speed reduction afforded by means 34, and the speed with which the motor 31 is run are so chosen that when switch arm 45 cooperates with contactor 51 the motor 31 will have run sufficiently far, before the contact is broken by descent of pulley 41, for the material 10 to run past the capstan 23 at a speed slightly in excess of the speed with which it is taken up at the feeding means 67 in the flyer 62. Such change of speed of material 10 at the feeding means 17 is relatively small; thus the speed at which the pulley 41 descends is relatively slow, thereby avoiding the imposition of mechanical shocks or material unbalances in the system due to marked acceleration or deceleration of masses.

When the pulley 41 has descended sufficiently for the contacts 46 and 47 on arm 45 to touch contacts 52 and 54, respectively, the motor 31 will again be started, this time in the reverse direction. The motor will, of course, remain rotating until the arm 45 is raised by the shortening of loop 40 to break the circuit through the contacts. During the time that the motor 31 remains running, with the arm 45 in its lower position, the nut 35 will have been lowered sufficiently by the motor to apply the brake shoe 24 more forcibly to the brake drum 22. The material 10 will thus be fed more slowly past the capstan 23 so that the loop 40 will begin to shorten and pulley 41 will begin slowly to rise. Thereupon the contacts on switch arm 45 will move away from the contacts on means 55, thereby shutting off the motor. The loop 40 therefore will now continually shorten, since the material at this time will be running more slowly past the capstan 23 than it will be drawn in from balloon x by the feeding means 67. Such process of alternately first paying the material into the loop at a rate slower than it is withdrawn therefrom by the feeding means and then faster than such rate of withdrawal from the balloon continues while the machine is in operation.

The above described manner of operation of the apparatus is that which will usually be carried out by it upon normal settings and adjustment of the parts. The apparatus will, however, continue to function to impose a constant tension on the balloon x by maintaining a variable supply of material 10 under constant tension and in tension-transmitting communication with the balloon even if occasionally the pulley 41 should not reach an end (first) point of its travel before again approaching the other (second) end point of its travel. In such case the switch arm 45 upon reaching the contactor at the second end point of travel will cooperate with the contactor at such point to cause the motor 31 to run so that the brake means 30 is adjusted to restore the system to a condition in which the pulley 41 once again has its full travel. In other words, the described pulley, switch arm, and contactors will function automatically to adjust the brake so that it imposes the higher and lower retarding torques on the strand being led into the balloon to maintain the full travel of the pulley 41 in both directions. Thus the maintenance of the balloon under uniform tension at all times is assured.

Figure 5:
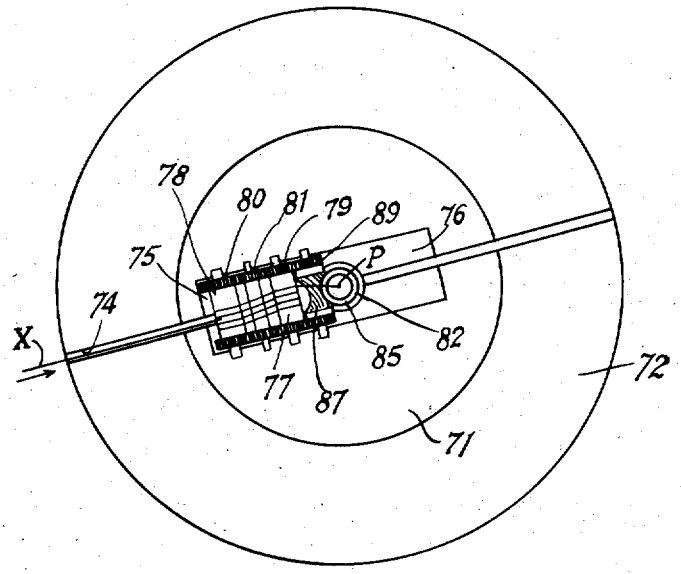
Fig. 5 is a view in horizontal section through the flyer of Fig. 4, the section being taken along the line 5—5 in Fig. 4.
Figure 4:
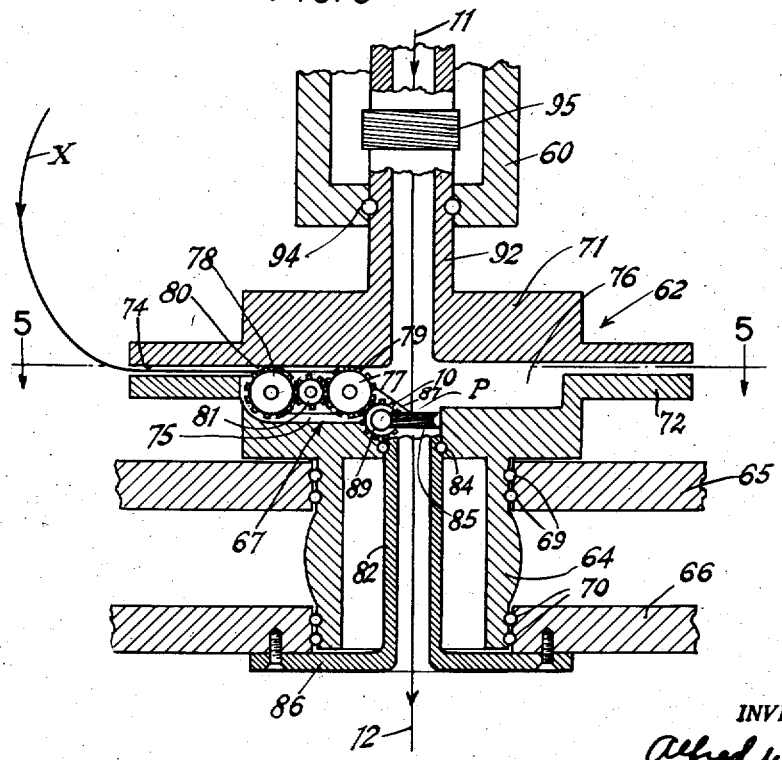
Fig. 4 is an enlarged view in axial section of the flyer of the spindle in Fig. 1.

The structure of flyer 62 and of the means 67 for withdrawing strand 10 from the balloon x will be more readily understood by a consideration of Figs. 4 and 5. The shaft 64 of the flyer, which has its outer surface crowned to engage a driving belt (not shown) is journalled in the bearings 69 and 70 in the upper and lower frame parts 65 and 66, respectively. The flyer 62 has a central thickened hub portion 71 with an outer disc-like portion 72 affixed thereto. A generally radially disposed passage 74 extends through member 72 into the cavity 75 in hub 71, the cavity 75 containing the feeding means 67. A somewhat smaller cavity 76 is disposed on the other side of the hub 71 so as to maintain the flyer 62 in dynamic balance.

The strand feeding means 67 is composed of an opposed spaced pair of multi-grooved capstans 77 and 78 journalled in the side walls of the cavity 75, as more clearly indicated in Fig. 5. Such capstans have on the ends thereof the gears 80 which mesh with the gears on the interposed idler gear member 81, so that the two capstans rotate in the same direction. The strand 10 is led in from the balloon x through the passage 74 and around the capstans 77 and 78 in the manner shown in Fig. 5, progressing from groove to groove so that it can finally be led off, in a radial direction, to the plying point P where it meets the strand 11 fed from the second let-off package 59. The capstans 77 and 78 derive their drive from rotation of the flyer 62, at a speed fixedly synchronized therewith, by means of the worm 85 fixedly held in space coaxial of the flyer and the worm gear and pinion member 87 interposed between the worm and the gears in the train 79, 81, and 80 connecting the capstans of the feeding means 67. The worm 85 is positioned within the flyer and is made integral with the vertical tube 82 which is held from rotation by the flange 86 on the bottom thereof, such flange being attached to the frame member 66. A ball bearing 84 is interposed between the bottom of the flyer and the top of the tube 82. Hour-glass worm gear 87 meshes with the worm 85, as shown more clearly in Fig. 5, such member having the pinions 89 on the ends thereof meshing with the pinions 79 on capstan 77. It will be apparent that when the pitch and hand of the worm 85 and the worm gear 87, their relative diameters, and the relative diameters of the gears 89 and 79 are properly correlated the capstans 77 and 78 will be rotated in the proper direction and through a desired angle for each rotation of the flyer 62, in other words, that the feeding means 67 will withdraw the material or strand 10 from the balloon x at the proper speed.

The grooved opposing capstans 61 for feeding the strand 11 from the package 59 are journalled on the supporting member 60, as shown in Fig. 1. Member 60, which also serves as a support for the package 59, is held from rotation by means of a horizontal spider member 88 attached thereto as shown in Fig. 1, such spider member having on its periphery the annular magnet 90. Surrounding the magnet 90 and spaced therefrom to provide an annular balloon receiving passage is a larger annular magnet 91 held on fixed structure of the machine (not shown). As shown in Fig. 4 member 60 is journalled on the upstanding central sleeve portion 92 of the flyer through the medium of ball bearings, one of which is shown at 94. Member 92 is made hollow, and is positioned coaxial of the flyer to provide a passage for the strand 11 to the plying point P. Affixed to the sleeve 92 is the worm 95, of proper pitch and diameter to drive the capstan 61 at the same peripheral speed as the capstans 77 and 78 through the medium of driving means (not shown) connected therewith.

It will be apparent that the mechanism of Figs. 1–5, inclusive, insures the delivery of equal lengths of strands 10 and 11 to the plying point P, and thus results in a stranded cord 12 which is substantially uniform insofar as the lengths of the strands 10 and 11 therein and the amount of twist of one about the other are concerned. It will also be apparent that the problem of control of the balloon x is solved by such mechanism, since the means 17 for feeding the strand 10 into such balloon is permissive rather than positive in character and is under the control of a means which insures the maintenance of the balloon under constant tension at all times and thus the maintenance of the balloon x of substantially uniform and desired diameter.

*Each of strand-feeding means 61, 61 and 67 feeds its strand at a definite speed with respect to the speed of rotation of the main shaft or flyer of the spindle. Means 61, 61 and 67 may thus each be termed a strand-metering means, and each includes strand-metering capstans.*

*The strand-metering means 61, 61 and 67 are coupled or connected to rotate in synchronism, and thus to meter their respective strands to the plying point in synchronism. The means coupling or connecting means 61, 61 and 67 is made up of the gear means 87, the worm gear 85, and the fixed tube 82, which cause the means 67 to rotate in synchronism with shaft 64, 92, and the worm gear 95 and the described gear means connecting means 61, 61 to worm gear 95, which cause the means 61, 61 to rotate in synchronism with shaft 64, 92.*

In Figs. 6 and 7 there are shown, respectively, a second embodiment of the plying system and a flyer of a twisting mechanism of a second construction used therein. In such system the strand 10′, which is ballooned about the second let-off supply 59′ and the strand 11′ fed therefrom, is fed into the balloon by a feeding means 110 which is positively driven in synchronism with the flyer 62′ by means of the belt 111 entrained over a driving means positively driven in synchronism with the pulley 64′. In order to maintain the balloon x′ within the proper range of diameters a balloon diameter measuring means such as shown in any of the applications of which this is a continuation-in-part may be employed, such means controlling the speed of rotation of the feeding means 67′ and of the capstans 61′, both such feeding means being synchronized to rotate at the same speed and both being under the control of the balloon diameter measuring means.

In Figs. 6 and 7 parts of the flyer 62' which are the same as those of the flyer 62 in the mechanism of Figs. 1–5, inclusive, are designated by the same reference characters with an added prime. Such flyer differs from flyer 62 in the following respects: The worm 85', rather than being fixed in space, is selectively rotatable in reverse directions in response to the balloon diameter measuring means, whereby to increase or decrease the speed of rotation of the feeding means 67' and 61'. The worm 85' is positioned on top of the tube 96, the bottom end of such tube being journalled in the frame member 99 through the medium of bearing 97. A worm gear 100 is keyed to the bottom of tube 96, such worm gear meshing with the worm 101 driven by the low voltage direct current reversible motor 102 through the medium of the speed reducing means 103.

The feeding means composed of capstans 61' for the strand 11' are driven in synchronism with and at the same speed as the capstans in the feeding means 67', so as to be variable in speed with means 67'. The capstans 61' are supported on the member 60', which is held from rotation by the magnetic means 90', 91' indicated. In this instance the sleeve 92' rising from the flyer 62' is employed merely as a support for means 60', driving of the capstans 61' being effected by the tube 107 journalled in the bearings 109 in the sleeve 92'. A worm (not shown) similar to worm 95 in Fig. 4 is keyed on tube 107, making connection with a further driving means (not shown) to the capstans 61'.

Driving connection between the tube 107 and the feeding means 67' is effected through the medium of the gear 105 meshing with the gear 79', such gear 105 being integral with a worm gear 104 meshing with the worm 106 on the bottom of tube 107. As pointed out above the capstans 77' and 78' rotate as the flyer 62' revolves about the worm 85'. With a proper choice of the pitch and hand of the worm 106 and the worm gear 104 and a proper choice of the relative diameters of the pinions 79' and 105, taken with the pitch and hand and reduction ratio of the driving means between the tube 107 and the capstans 61' such feeding means for strand 11' will rotate at the same speed as the capstans in feeding means 67'. The speed of the two feeding means remains constant so long as the worm 85' is at rest. Rotation of worm 85' by motor 102, driving through speed reducer 103, in one direction will result in a net decrease in the speed of feeding of materials by means 67' and 61', and rotation of the worm 85' in the other direction by the motor 102 will result in the increase in the speeds of such feeding means. The worm gear 100 and the worm 101 are irreversible, that is, the worm 101 will not be turned by the tube 96 when the motor 102 is at rest. Thus the two strand feeding means will rotate at a definite predetermined speed when motor 102 is at rest but may be varied within appreciable limits depending upon the direction of rotation of the motor and the speed with which it rotates.

*Since the means 61', 61' and 67' of Figs. 6 and 7 both engage the strands 11' and 10', respectively, substantially without slip, they both may be properly termed strand-metering means, and each includes strand-metering capstans.*

*The strand-metering means 61', 61' and 67' are coupled or connected to rotate in synchronism, and thus to meter their respective strands to the plying point in synchronism. The means coupling or connecting means 61', 61' and 67' is made up of the gear 79', the gear 105, the meshing worm 104 and worm gear 106, the tube 107, the described worm gear on tube 107, and the described worm gear, similar to worm 95 of Figs. 1–5, inclusive, which meshes with the described worm gear connected to means 61', 61'. The speed of rotation of the capstans of strand-metering means 61', 61' and 67' may be varied with respect to the speed of rotation of the shaft 64', 92' by varying the speed and/or direction of rotation of tube 96 upon which worm 85' is mounted.*

Motor 102 is under the control of a balloon diameter measuring or sensing means 398, schematically indicated in Fig. 6, which may be of the type shown in Fig. 10 of my application Serial No. 317,406, filed October 29, 1952. Means 398 comprises a rotatable balloon engaging and guiding eye which detects and is responsive to changes in the diameter of the balloon and a switch operated by the eye to control the mechanism to restore the balloon to the desired diameter. As above pointed out, under all circumstances equal lengths of each of strands 10' and 11' are fed to the point P' at which they are plied together. The speed of the two strand feeding means is under the control of the balloon diameter measuring or sensing means, the motor 102 remaining at rest and the feeding means for the two strands rotating at their normal fixed speeds when the diameter of the balloon is within the predetermined optimum range. If the balloon should expand unduly, however, the balloon diameter measuring means 398 energizes the motor 102 in such direction as to withdraw the strand 10' from the balloon x' at a faster rate than normal until the balloon has been reduced to the predetermined optimum range. Thereupon the motor 102 ceases to rotate and the strand feeding means 67' and 61' resume their normal speed of feeding. The reverse operation takes place if the balloon x' should become reduced in diameter unduly, the motor 102 then being driven in a reverse direction for such period of time as is necessary to expand the balloon to its predetermined optimum range.

Whereas I have described preferred embodiments of the method of and apparatus for plying strands together to form cords, it will be understood that such embodiments are illustrative only. The invention is, therefore, to be defined by the scope of the claims appended hereto.

I claim as new the following:

1. Apparatus for handling elongated flexible material comprising a hollow shaft, a balloon creating flyer mounted coaxial of the shaft for independent rotation with respect thereto, means for rotating the flyer, a driven material feeding means supported by the flyer for rotation therewith about the axis of the flyer, and means drivingly connecting the shaft to the feeding means whereby the material feeding means is driven by the rotation of the flyer relative to the shaft, a generally radial material conducting passage in the flyer radially outwardly of the material feeding means, the shaft and the driving connection between it and the feeding means being so positioned relative to the flyer as to leave unimpeded a zone of the flyer at the axis thereof and beyond the shaft whereby material may be fed from the feeding means in the flyer into and through the shaft.

2. Mechanism for twisting together two strands so as to form a two-ply strand, comprising a support carrying a first let-off strand package and a support carrying a second let-off strand package, a revolving shaft operable to rotate a balloon of the strand of the first package about the second package and also to ply the two strands together at a plying junction, a first means for feeding the first strand into the balloon, and a second means contacting the respective strands in advance of the plying junction for positively feeding the two strands forward from the balloon and from the second package, respectively, to the plying junction.

3. Mechanism for twisting together two strands so as to form a two-ply strand, comprising a support carrying a first let-off strand package and a support carrying a second let-off strand package, a revolving shaft operable to rotate a balloon of the strand of the first package about the second package and also to ply the two strands together at a plying junction, a first means for feeding the first strand into the balloon, a second means for positively feeding forward the second strand from the second package, and a third means for positively feeding forward the first strand and withdrawing it from the balloon, both the last named means contacting the respective strands in advance of the plying junction and feeding the two strands forward to the plying junction.

4. Mechanism for twisting together two strands so as to form a two-ply strand, comprising a support carrying a first let-off strand package and a support carrying a second let-off strand package, means operable to rotate a balloon of the first strand about the second package and also to ply the two strands together at a plying junction, a first means for feeding the first strand into the balloon, a second means for positively feeding forward the second strand to the plying junction, and a third means for withdrawing the first strand from the balloon and positively feeding it forward to such junction at the same rate as the second feeding means, both the last two named means contacting the respective strands in advance of the plying junction.

5. Mechanism for twisting together two strands so as to form a two-ply strand, comprising a support carrying a first let-off strand package and a support carrying a second let-off strand package, means operable to rotate a balloon of the first strand about the second package and also to ply the two strands together, a first means for feeding the first strand into the balloon at a variable rate, a second means for positively feeding forward the second strand at a fixed rate to the junction where the strands are plied together, and a third means for withdrawing the first strand from the balloon and positively feeding it forward to such junction at the same fixed rate as the second feeding means.

6. Mechanism for twisting together two strands so as to form a two-ply strand, comprising a support carrying a first let-off strand package and a support carrying a second let-off strand package, a flyer operable to rotate a balloon of the first strand about the second package and also to ply the two stands together, a first means for feeding the first stand into the balloon at a variable rate, a second means for positively feeding forward the second strand to the junction where the stands are plied together, a third means supported by and rotatable with the flyer for withdrawing the first strand from the balloon and positively feeding it forward to such junction at the same rate as the second feeding means, and means to control the relative speeds of the first feeding means and of the second and third feeding means so as to maintain the balloon of substantially constant diameter.

7. Mechanism for twisting together two strands so as to form a two-ply strand, comprising a support carrying a first let-off strand package, a twisting spindle carrying a support for a second let-off strand package, said spindle having a flyer operable to rotate a balloon of the first strand about the second package and also to ply the two strands together, a balloon guiding eye positioned coaxial of the flyer, a first means positioned to engage the first strand in its travel between the first package and such eye for feeding the first strand into the balloon at a variable rate, a second means supported on the spindle and positioned within the balloon and above the flyer for positively feeding forward the second strand at a fixed rate to the junction where the strands are plied together, a third means supported by and rotatable with the flyer for withdrawing the first strand from the balloon and positively feeding it forward to such junction at the same fixed rate as the second feeding means, and means to control the first feeding means so as to maintain the balloon of substantially constant diameter.

8. Mechanism for twisting together two strands so as to form a two-ply strand, comprising a support carrying a first let-off strand package and a support carrying a second let-off strand package, a revolving flyer operable to rotate a balloon of the strand of the first package about the second package and also to ply the two strands together, a first means for feeding the first strand into the balloon, a second means supported and driven by the flyer for positively feeding the second strand from the second package, and a third means supported by and rotatable with the flyer and driven by rotation of the flyer for positively feeding the first strand from the balloon, said second and third feeding means forwarding the strands to the junction where they are plied together.

9. The method of twisting together two strands so as to form a two-ply strand which comprises positively feeding a first strand from a source of supply, feeding a second strand from a source of supply into a balloon, rotating the balloon about the first source of supply and about the first strand fed therefrom to ply the two strands together at a plying junction, and positively gripping and feeding the second strand at a location between the balloon and the plying junction to withdrawn it from the balloon and forward it to the plying junction.

10. The method of twisting together two strands so as to form a two-ply strand which comprises positively feeding a first strand from a source of supply, feeding a second strand from a source of supply into a balloon, rotating the balloon about the first source of supply and about the first strand fed therefrom to ply the two strands together at a plying junction, and positively feeding the second strand at the same rate as the positive feeding of the first strand by gripping and feeding the second strand at a location between the balloon and the plying junction to withdraw such second strand from the balloon and to forward it to the plying junction.

11. The method of twisting together two strands so as to form a two-ply strand which comprises positively feeding a first strand from a source of supply at a fixed rate, feeding a second strand from a source of supply into a balloon, rotating the balloon about the first source of supply and about the first strand fed therefrom to ply the two strands together at a plying junction, and positively feeding the second strand at the same fixed rate as that at which the first strand is fed by gripping and feeding the second strand at a location between the balloon and the plying junction to withdraw such second strand from the balloon and to forward it to the plying junction.

12. The method of twisting together two strands so as to form a two-ply strand which comprises positively feeding a first strand at a predetermined fixed rate from a source of supply, feeding a second strand from a source of supply into a balloon at a variable rate, rotating the balloon about the first source of supply and about the first strand fed therefrom to ply the two strands together, positively feeding the second strand at the same fixed rate as the positive feeding of the first strand to withdraw the second strand from the balloon and to forward it to the junction where the two strands are plied together, and controlling the speed of feeding of the second strand into the balloon so as to maintain the balloon of substantially constant diameter.

13. The method of twisting together two strands so as to form a two-ply strand which comprises positively feeding at a variable rate a first strand from a source of supply, positively feeding at a fixed rate a second strand from a source of supply, into a balloon, rotating the balloon about the first source of supply and about the first strand fed therefrom to ply the two strands together, and positively feeding the second strand at a variable rate which instantaneously equals that of the rate of feeding of the first strand to withdrawn the second strand from the balloon and to forward it to the junction where the two strands are plied together, and varying the speed of forwarding of the first and second strands to the point of plying relative to the speed of feeding of the second strand into the balloon so as to maintain the balloon of substantially constant diameter.

14. Mechanism for twisting together two strands so as to form a two-ply strand, comprising a source of supply of a first strand and a support carrying a let-off strand package for a second strand, a rotatable shaft operable to rotate a balloon of the first strand about the let-off package and also to ply the two strands together, a first means for feeding the first strand into the balloon, balloon-engaging means for detecting changes in the shape of the balloon, a second means for feeding the second strand to the junction where they are plied together, and means responsive to the balloon-shape-detecting means to vary the speeds of the first and second feeding means relative to each other whereby to maintain the diameter of the balloon within predetermined limits.

15. Mechanism for twisting together two strands so as to form a two-ply strand, comprising a source of supply of a first strand and a support carrying a let-off strand package for a second strand, a rotatable shaft operable to rotate a balloon of the first strand about the let-off package and also to ply the two strands together, a first means for feeding the first strand into the balloon, means for detecting changes in the shape of the balloon, a second means for feeding the second strand to the junction where they are plied together, and means responsive to the balloon-shape-detecting means to vary the speeds of the first and second feeding means relative to each other whereby to maintain the diameter of the balloon within predetermined limits.

[16. Mechanism for twisting together two strands so as to form a two-ply strand, comprising a source of supply of a first strand and a support carrying a let-off strand package for a second strand, a rotatable shaft operable to rotate a balloon of the first strand about the let-off package and also to ply the two strands together, a first means for feeding the first strand into the balloon, balloon-engaging means for detecting changes in the shape of the balloon, a second means for feeding the second strand to the junction where they are plied together, and means responsive to the balloon-shape-detecting means to vary the tension in the balloon to maintain the tension therein within predetermined limits.]

[17. Mechanism for twisting together two strands so as to form a two-ply strand, comprising a source of supply of a first strand and a support carrying a let-off strand package for a second strand, a rotatable shaft operable to rotate a balloon of the first strand about the let-off package and also to ply the two strands together, a first means for feeding the first strand into the balloon, means for detecting changes in the shape of the balloon, a second means for feeding the second strand to the junction where they are plied together, and means responsive to the balloon-shape-detecting means to vary the tension in the balloon to maintain the tension therein within predetermined limits.]

*18. In an apparatus for plying strands at a plying point, and having means to rotate a first strand, from a first source, in the form of a balloon, and means to guide a second strand from a package within the balloon generally along the axis of the balloon, the improvement which comprises a shaft rotatable about said balloon axis,*

*a first means on the shaft engaging and metering the first strand in its passage toward the plying point, a second means engaging and metering the second strand in its travel from the package, and means coupling the said two metering means to cause them to feed their respective strands in synchronism.*

*19. An apparatus as defined in claim 18, wherein the metering means each comprises a rotatable capstan.*

*20. An apparatus as defined in claim 19, wherein the means coupling the two metering means comprises gear means.*

*21. An apparatus as defined in claim 18, wherein the means coupling the two metering means comprises serially connected parts interposed between the metering means, said coupling means being rotatable at speeds which are variable with respect to the speed of the shaft.*

*22. Mechanism for twisting together at least two strands so as to form a multi-ply strand, comprising a source of a first strand and a support carrying a let-off package for a second strand, means operable to rotate a loop of the first strand about the package and also to ply the two strands together, said means including a shaft mounted coaxial of the loop and for rotation about its axis with the loop, a first means mounted on the shaft and rotatable therewith for metering the first strand in its travel from the loop, a second means for metering the second strand in its travel from the package, and means coupling the two metering means together, said metering means positively engaging their respective strands and equalizing the speeds of travel thereof to a plying point generally on the axis of the shaft.*

*23. A mechanism as defined in claim 22, wherein the metering means each comprises a rotatable capstan.*

*24. A mechanism as defined in claim 22, wherein the second metering means is mounted on the support for the let-off package.*

*25. The method of twisting together two strands so as to form a two-ply strand which comprises gripping and metering a first strand to feed it from a first source of supply, feeding a second strand from a second source of supply into a balloon, rotating the balloon about the first source of supply and the first strand fed therefrom to ply the two strands together at a plying junction, gripping and metering the second strand at a zone between at least the major portion of the balloon and the plying junction to feed the second strand from the balloon, and equalizing the rates of gripping and metering of the strands whereby the two strands pass at equal rates to the plying junction.*

*26. The method as defined in claim 25, wherein the gripping and metering of the respective strands takes place at zones from which the strands travel in substantially straight lines to the plying junction.*

References Cited in the file of this patent or the original patent 2,503,242 Clarkson ---------- Apr. 11, 1950